(12) United States Patent
Billings

(10) Patent No.: US 7,149,597 B2
(45) Date of Patent: Dec. 12, 2006

(54) PROCESS CONTROL SYSTEM AND METHOD

(76) Inventor: John Billings, 8906-147th Ave. SE., Snohomish, WA (US) 98290

( * ) Notice: Subject to any disclaimer, the term of this patent is extended or adjusted under 35 U.S.C. 154(b) by 642 days.

(21) Appl. No.: 10/158,781

(22) Filed: May 29, 2002

(65) Prior Publication Data
US 2003/0033040 A1 Feb. 13, 2003

Related U.S. Application Data

(60) Provisional application No. 60/294,320, filed on May 29, 2001.

(51) Int. Cl.
*G06F 19/00* (2006.01)

(52) U.S. Cl. .................. 700/117; 700/28; 700/97; 706/14

(58) Field of Classification Search .......... 700/97, 700/109, 117, 206, 28; 706/14; 705/400, 705/409
See application file for complete search history.

(56) References Cited

U.S. PATENT DOCUMENTS 5,249,120 A * 9/1993 Foley .................. 705/1

6,678,668 B1 * 1/2004 Fisher et al. .......... 706/14

\* cited by examiner

*Primary Examiner*—Leo Picard
*Assistant Examiner*—Sheela S. Rao
(74) *Attorney, Agent, or Firm*—Seed IP Law Group PLLC

(57) ABSTRACT

A process control method for producing acceptable product within a range of acceptable specifications and unacceptable product that are not within the range of acceptable specifications to optimize profit and utilization of resources, the process having at least one input and at least one output that is affected by variation in at least one input, the method including varying the input about a mean of at least one acceptable specification so that the output is optimized to where the revenue from producing one more acceptable unit of product is substantially equal to the cost of producing one more unacceptable unit of product. In another embodiment, a method is provided that includes optimizing a process having inputs and outputs by measuring the inputs and outputs; determining variation of the mean ($u_{of}$) and variation about the mean ($u_{abt}$); determining causes of $u_{of}$; and controlling $u_{of}$ to match $u_{abt}$ data values. The method would further include determining the relationship between the output defect rate and changes in inputs, control of $u_{of}$; modeling the relationship; and solving for optimum set point of one or more of the inputs. Controlling $u_{of}$ can include adjusting the inputs, and solving for optimum set point ideally involves utilizing functions for input defect rate, revenue, and cost

15 Claims, 9 Drawing Sheets

| quantity | cost | sp | reject% | rejects | cost | sales | profit |
|---|---|---|---|---|---|---|---|
| 10 | 0.1 | 0.5 | 0 | 0 | 1 | 5 | 4 |
| 20 | 0.1 | 0.5 | 10 | 2 | 2 | 9 | 7 |
| 30 | 0.1 | 0.5 | 20 | 6 | 3 | 12 | 9 |
| 40 | 0.1 | 0.5 | 30 | 12 | 4 | 14 | 10 |
| 44 | 0.1 | 0.5 | 34 | 14.96 | 4.4 | 14.52 | 10.12 |
| 45 | 0.1 | 0.5 | 35 | 15.75 | 4.5 | 14.625 | 10.125 |
| 46 | 0.1 | 0.5 | 36 | 16.56 | 4.6 | 14.72 | 10.12 |
| 49 | 0.1 | 0.5 | 39 | 19.11 | 4.9 | 14.945 | 10.045 |
| 50 | 0.1 | 0.5 | 40 | 20 | 5 | 15 | 10 |
| 51 | 0.1 | 0.5 | 41 | 20.91 | 5.1 | 15.045 | 9.945 |
| 55 | 0.1 | 0.5 | 45 | 24.75 | 5.5 | 15.125 | 9.625 |
| 60 | 0.1 | 0.5 | 50 | 30 | 6 | 15 | 9 |
| 70 | 0.1 | 0.5 | 60 | 42 | 7 | 14 | 7 |
| 80 | 0.1 | 0.5 | 70 | 56 | 8 | 12 | 4 |
| 90 | 0.1 | 0.5 | 80 | 72 | 9 | 9 | 0 |
| 100 | 0.1 | 0.5 | 90 | 90 | 10 | 5 | -5 |

PROCESS CONTROL SYSTEM AND METHOD

RELATED APPLICATIONS

The present application claims priority from U.S. Provisional Application No. 60/294,320 filed May 29, 2001, entitled PROCESS CONTROL SYSTEM AND METHOD, which is incorporated herein in its entirety.

BACKGROUND OF THE INVENTION

1. Field of the Invention

The present invention pertains to process management, and more particularly, to a system and method for monitoring and adjusting one or more process inputs, including determining and utilizing an optimum set point of one or more selected variables, to achieve optimization of one or more outputs.

2. Description of the Related Art

The purpose of process control is to optimize inputs and outputs. A representative activity that invokes these goals is the processing of raw or semi-finished materials for use in the manufacture of goods. In this context a manufacturing process is defined as inputs (materials, components, and manual or machine operations, automatic or manual) that are combined to create a product. Although the disclosed embodiments of the invention are discussed and described in this context, it is to be understood that the present invention will have application in other processes having the same or similar objectives.

All manufacturing processes exhibit variation of inputs, resulting in end product output variation. Output variation needs to be within certain parameters to create a product that meets an end user's specifications. Variation in inputs can take the form of naturally occurring variation about a central mean, or it can be variation that is controlled or changed by varying inputs. Such inputs can be quantity of material, line speed, temperature, moisture, line speed/cycle time, thickness, density, catalysts, accelerants, adhesives, resins, or other inputs, such as sharpening a tool, moving a press roll, calendar roll, adjusting an extruder die, etc.

If it were not for variation, inputs could be combined to yield a perfect or predictable output (product), such as the production of flat glass, from silica, on a float glass line. Because of input variation the glass output or end product will have characteristics that vary, e.g., thickness, strength, weight, and optical quality.

Providers of raw materials and the manufacturers of goods are faced with the challenge of manufacturing products that meet their customers' strict quality requirements while attempting to minimize production costs and optimize outputs. The product characteristics, such as thickness or strength, generally must fall within a specified range of quality measurements. Failure to meet quality requirements will require scrapping of the materials or additional labor and materials to rework the product. Accordingly, a manufacturer must then manage the process in order to produce a product having a target point that falls within the specified range. Normal process management does not intentionally produce defective product, and it accepts variation in output resulting from variation in input.

A product's target point is the desired point of the product's quality within the specified range of quality measurement. Where the target point falls within the specified range has a significant impact on production costs. The higher the production costs, the lower the financial margins realized in the production of a given product or set of products.

Generally any output falling within the range of specifications is acceptable. Output outside of this range is not acceptable. It is normal manufacturing practice to set or to select inputs such that all outputs fall within the acceptable range. It is also common practice to set an input target at a value and allowable variation that is economically justified, based on the process capability of the process producing that input.

As an example, seven-ply veneer plywood, with a specified thickness of 0.750 inches, plus or minus 0.030 inches can be easily produced within specification, if each of the seven plies of veneer can be produced to a target thickness of plus or minus 0.001 inches. Unfortunately the acceptable tolerance for green veneer production is plus/minus 0.005 inches or greater. The seven plies of green veneer alone yield a plywood panel thickness variation of plus/minus 0.035 inches, exceeding the product specification of plus/minus 0.030 inches. The thickness variation in subsequent processing of veneer drying, resin application and hot pressing is in addition to the green veneer variation, further exceeding the product specification.

A large percentage of products in the foregoing example fall outside (below) the customer lower specification limit (LSL) or above the upper specification limit (USL), as illustrated in FIG. 1. A subsequent process operation of finish panel sanding will reduce panel thickness, bringing thicker panels that are above the USL, within specification. This operation will also reduce the thickness of some of the panels that are within the specification limit, to go below the LSL. One solution to this problem is to peel the veneer thicker so that the target thickness of the veneer is almost always above the LSL. If the laid up target thickness of the veneer is selected to be 3 standard deviations above the LSL for the panel, only a small percentage of the pressed plywood panels will be below the LSL. In this solution however, a much higher percentage of pressed plywood panels will be above the USL. At three sigma, approximately 99.85% of the finished plywood panels will be above the LSL. This does mean, however, that 1,350 panels out of each million produced will still be below the LSL. Setting sigma to six means that only one out of every billion panels will be below the LSL. This solution will require a great deal of extra veneer and additional finished panel sanding. For panels with a thin facing of expensive veneer (hardwoods), thicker panels will have some of the outside face entirely sanded away, exposing the core. These panels must be scrapped or downgraded. This solution requires extra veneer, energy for drying the extra veneer, energy for pressing, additional press cycle time, sanding expense, and has a negative environmental impact.

Other processes are similar in concept but different in application. Common to these processes, is setting the process inputs, such that the resulting output is within the LSL and USL. These solutions require excess costs, produce a product with more variation, and sacrifice in output quality. In processes where there is only a minimum, or LSL, the process is adjusted to be above this LSL, to ensure that the customer is given fair measure. Examples include food, tire or panel strength, paper weight and strength, ceiling tile thickness and weight, and gypsum wallboard thickness and weight.

SUMMARY OF THE INVENTION

The embodiments of the present invention relate to a system and method that enables manufacturers to optimize their process, while ensuring that only products that meet quality requirements are shipped to customers. In one embodiment, a process is optimized by varying manufacturing inputs to a point where the cost of manufacturing one more unit of defective product is exactly equal to the benefit derived from making one more unit of good product. In another embodiment of the invention, a method of using variation about the mean of various inputs (process operations and materials) is provided to optimize outputs.

In order to assure acceptable output quality (within specifications), the key process inputs and outputs must be identified and measured. Information that is taken manually by operators suffers from operator influence on the measurement and it is not practical to gather enough data to meet the large data population requirements to detect variation of the mean and variation about the mean. Continuous data, taken frequently (to gather a large data population and to be taken frequently enough to reveal true sources of variation), can be used to determine the difference between these two means. The relative frequency of occurrence of a measurement value, in a large number of measurements, will yield a good estimate of the actual values.

One aspect of this invention requires the production of a controlled number of defective products. Thus, in accordance with one aspect of the invention, a means is provided for accurately measuring inputs and outputs to identify good and defective product in the form of a product marking system that ensures that acceptable product is identified for customer shipment and that defective product is identified so as not to be shipped.

In accordance with yet a further embodiment of the invention, a method and system are provided that enables determination of an optimum set point, or target, for inputs and outputs to maximize output while achieving maximum efficiency in order to conserve resources and reduce costs.

One aspect of this embodiment of the invention is modifying the optimum set point to accommodate the manufacturing cost of the product, defect rate of output based on changes in input, and the selling price of the product. A larger percentage of "bad" products can be produced if the selling price of the product is substantially higher than the manufacturing cost of the product. Conversely, the allowable percentage of "bad" product will need to be reduced as the manufacturing cost of the product approaches the selling price of the product.

In accordance with another embodiment of the invention, a method of controlling a process for producing acceptable product within a range of acceptable specifications and unacceptable product that are not within the range of acceptable specifications is provided, the process having at least one input and at least one output that is affected by variation in at least one input. The method includes varying the at least one input about a mean of at least one acceptable specification so that the at least one output is affected by the at least one varied input. The input is varied to the point where the process output is optimized to where the cost of producing one more acceptable product is equal to the cost of producing one more unacceptable product.

In accordance with another embodiment of the invention, a method of optimizing a process having at least one output that varies in response to variation of at least one input is provided that includes determining the key input and output variables of the at least one input and the at least one output to measure; measuring the key input and output variables of the at least one input and the at least one output while the variables are adjusted in the course of performing the process; determining the variation of the mean and the variation about the mean for each of the key measured variables of the at least one output; determining an adjustment or change in the variables in the at least one input required to bring the mean of the variables in the at least one output within a target value range; determining the relationship between changes in input and defect rate of output, determining the cost of making one more unacceptable product that is equal to the profit from making one more acceptable product; and adjusting the key variables in the at least one input to achieve optimization.

In accordance with a further embodiment of the invention, a method of optimizing a manufacturing process is disclosed that includes providing a plurality of components and process operations, the components configured to be assembled together into a single unit; and matching components and operations that are under tolerance or caused to be under tolerance to components and operations that are over tolerance or caused to be over tolerance to achieve a single unit that is within tolerance.

In accordance with still yet another embodiment of the invention, a manufacturing process is provided that involves matching a first subcomponent that is under a mean tolerance with a second subcomponent that is over the mean tolerance to achieve a component formed of the first and second subcomponents that is at the mean tolerance. Ideally, the first subcomponent is under the mean tolerance to the same degree that the second subcomponent is over the mean tolerance.

The reason for the need for this invention is specifically to manage the variation that occurs in industrial processes. If a process could be designed that used inputs to produce exactly the same output, there would not be a need for this invention. In fact, all processes exhibit some degree of variation. Process variation occurs for two reasons. The first is "variation of the mean," and it occurs due to a specific identified cause. A process will have designed into it a level of adjustment to correct for this variation. Examples could include a tool that wears so that it results in an off-size component; a convection oven where airflow is restricted by dirt or contamination; the platen in a press that becomes distorted or warped; a die that becomes worn; a nozzle that becomes partially clogged; a solder bath whose temperature varies due to solder level or content; the moisture content or temperature of a log that is to be peeled or sawn; or a pressure roll where force varies due to a leaky hydraulic cylinder. If the results of any of the above are measured frequently and accurately, the process can be adjusted and brought back to target or specification by changing the subject of the variation. If variation of the mean is allowed to continue, it will normally move further away from the original target value. The second source of variation is variation about the mean. Variation about the mean is sometimes called natural variation. It is very different from variation of the mean in that it is random and fluctuates about a central point or value. Individual values will fall above or below (or on either side) of a central value or mean. Approximately one-half of the values will be distributed above the mean value and about one-half will be below. The distance of a measured value above the mean will have a corresponding value below the mean. This source of variation is not predictable and if attempts are made to adjust the process due to a value that is about the mean, it will make the process deviate from the intended target or make the process worse. Examples of this type of variation are movement in a machine due to vibration, relief of inbuilt stresses, variation in movement of a machine or part of a machine due to normal tolerance in bearings, minor changes in hydraulic oil viscosity, parametric variation in a transistor or memory chip, very small variation in the physical or chemical composition of a raw material, and other natural changes. The disclosed embodiments of the invention cover a (means or method) of determining $u_{of}$ and $u_{abt}$, assigning causes to $u_{of}$, controlling $u_{of}$, matching $u_{abt}$ values to optimize or improve the process, determine defect rate of output as a function of changing inputs, modeling the process, solving for an optimization of inputs and outputs as a function of defect rate, variation, revenue and cost.

Thus, in one embodiment of the invention, a method is provided that includes optimizing a process having inputs and outputs by measuring the inputs and outputs and saving data therefrom; determining $u_{of}$ and $u_{abt}$ from the data; determining causes of $u_{of}$; and controlling $u_{of}$ to match $u_{abt}$ data values. Ideally, the method would further include determining the relationship between the output defect rate and control of $u_{of}$; modeling the relationship; and solving for an optimum set point of one or more of the inputs. Controlling $u_{of}$ can include adjusting the inputs, and solving for optimum set point ideally involves utilizing functions for input defect rate or revenue or cost or a combination of the foregoing.

In accordance with yet another embodiment of the invention, a system for producing engineered wood is provided that includes a device for forming sheets of wood; a press for bonding the sheets of wood with a bonding agent with the application of heat and pressure for a cycle time to form engineered wood product; a bond integrity inspection system configured to measure the bond strength of the product and to generate a bond measurement signal; and a process controller configured to receive the bond measurement signal and to adjust at least one of the heat, pressure, and cycle time of the press to maximize profits while permitting a controlled quantity of defective product to be produced.

In accordance with still yet another embodiment of the invention, changing different inputs (to optimize profit) can have the same or similar effects on an output or output characteristic. An example of this would be on the final thickness of a finished plywood panel. Veneer thickness, moisture content, pressing (temperature, pressure and cycle time), wood species and sanding all have an effect on final panel thickness. Similarly the final panel internal bond strength is also affected by many of these inputs. Changes to individual inputs can result in output optimization based on output defect rates, cost and selling price (profit). This embodiment of the invention provides a method of solving for a combination of input changes that optimizes output based on defect rates, cost and selling price. In one form, the method utilizes a mathematical model, function or equation of the change in an individual input and the change in output based on defect rate, cost and selling price. These functions can be solved simultaneously to arrive at optimum input and output target set-points. This model of input changes and resulting output changes can also be solved iteratively, such as on a computer.

Other embodiments of the invention directed to the system and individual components are discussed and described in more detail below.

BRIEF DESCRIPTION OF THE DRAWINGS

The foregoing and other features and advantages of the disclosed embodiments of the invention will be more readily appreciated from the accompanying detailed description when taken in conjunction with the following drawings, wherein:

FIGS. 2A–2D are a table and accompanying graphs of Quantity versus Profit, Cost versus Sales, and Rejects, respectively, illustrating a method in accordance with one embodiment of the present invention;

DETAILED DESCRIPTION OF THE INVENTION

Definitions

Figure 1:
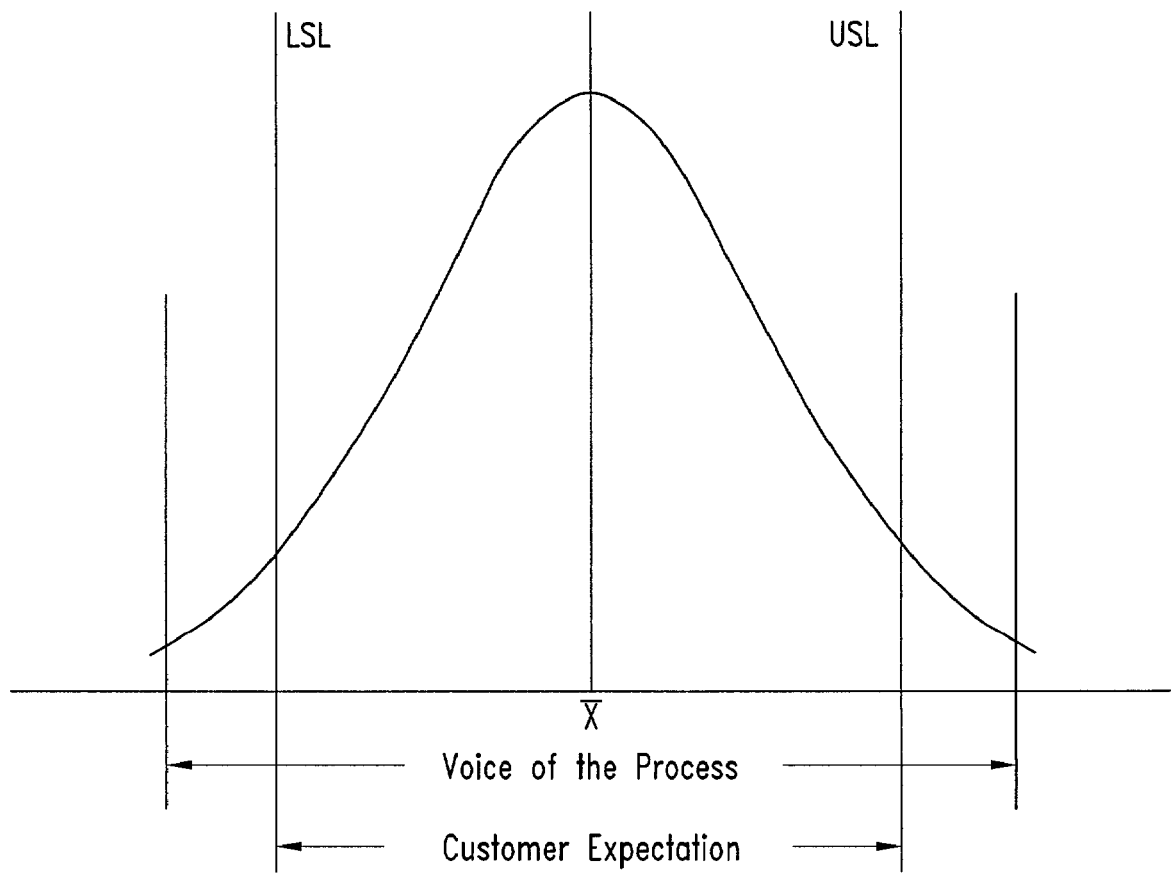
FIG. 1 is a graph illustrating customer expectations and the voice of the process.
Figures 2A, 2B:
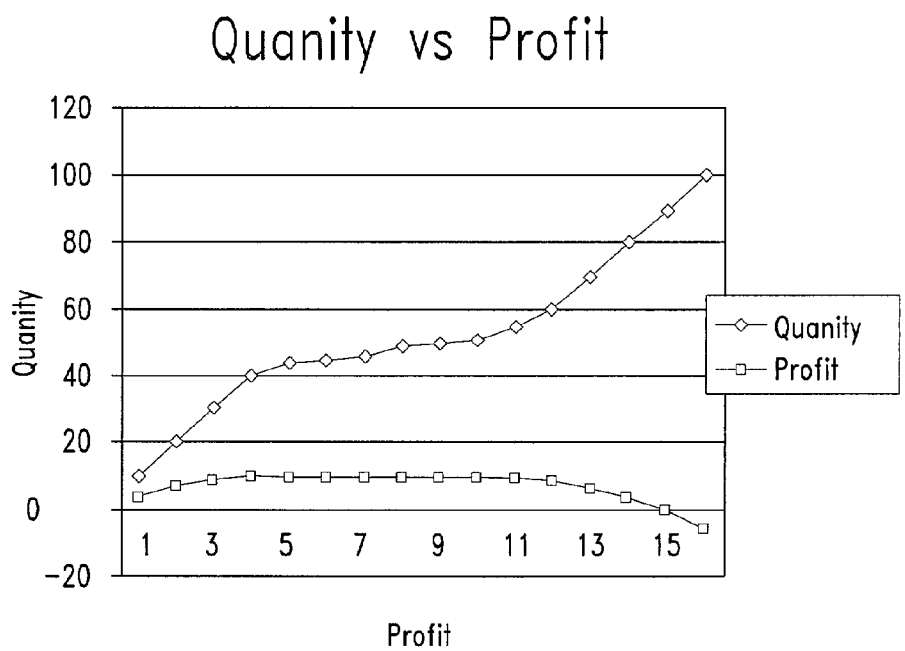

Input—A parameter of a component or operation of the process, e.g., veneer thickness, line speed, cycle time, temperature, pressure. Output of one stage in a process can be the input to a subsequent stage of the process.

Output—A parameter of a component of a process resulting from one or more inputs. Output can be a final end product for a customer or it can be a component of the final end product.

Variation—Actual measured values, of some physical or chemical property, compared to a target or intended value.

Variation of the mean ($u_{of}$)—Mean measured value of a large population or of some physical or chemical value, that is different than the target or intended value or outcome. $u_{of}$ is not random; it is predictable and has one or more assignable causes. In a process it could be output variation of a nozzle caused by material consistency or part tolerance variation caused by tool wear.

Variation about the mean ($u_{abt}$)—Measured values clustered about a central point of a large population or of some physical or chemical value that are different from the intended value or outcome. $u_{abt}$ is random; it is not predictable and does not have an assignable cause. An example would be a coin toss with the outcome being heads or tails or a rolling of two die with an outcome of values from two to twelve. In a process it could be machine movement caused by vibration or relief of inbuilt stresses.

Optimization—In a process, a set of conditions, whereby changing one or more inputs can result in a favorable change in one or more outputs. A favorable change could include, lower unit or total cost, higher revenue, increased profit, an improved product quality, or improved environmental output. Optimization occurs at a point where further changes to one or more inputs results in an unfavorable change in overall output.

Target or setpoint—In process control management, the target or setpoint is the intended, desired, or specified value of inputs and outputs.

The disclosed embodiments of the invention are directed to an optimized or more optimized solution where changing an input or output variable results in improvement of one or more of; productivity (production throughput), material costs, energy costs, and distribution and delivery costs, product, and environmental quality. This solution requires continuous, on-line, frequent measurement of key output and certain input variables. The objective of these measurements is to determine the variation of the mean and the variation about the mean, which are described in more detail below. The function of the measured mean and frequency distribution $f(u_{meas})$ is equal to the function of the variation of values of the mean and it's frequency distribution $f(u_{of})$ plus the function of values about the mean and it's frequency distribution $f(u_{abt})$, whereby $f(u_{abt})=f(u_{meas})-f(u_{of})$. It is well known that process control can be used to shift the mean to the target. Variation about the mean as a part of the process in the context of the present invention is described in more detail herein below.

This solution goes beyond conventional process control techniques to further optimize the process by adjusting inputs and outputs to operate at setpoints where inputs are used more efficiently than normal adjustment of just inputs and output means. Conventional process manufacturing attempts to make all "good" product. The method of the present invention uses inputs more efficiently by making an optimized level of defective product so that energy, material, and freight costs can be reduced and productivity increased.

The disclosed embodiments of the present invention reduce the costs of the inputs and increase the output and revenue by combining inputs to purposely operate the process at a level where a planned level of defective inputs and outputs (products) are produced. This optimization point is where an incremental change in any input will produce less overall output benefit. Output benefit can be in reduced costs, higher revenue, or increased profits, or any combination of the foregoing.

Referring to FIGS. 2A–2D, illustrated therein as an example is a company that has a manufacturing process where a product is produced having a variable cost of $0.1 each. The selling price is $0.5 each. One input variable is production speed. As production speed is increased, output quantity is increased, but the defect level increases proportionately.

In this example the goal is to optimize for maximum profit. However, it is to be understood that other parameters, such as energy costs, material costs, freight costs, revenue, and or environmental emissions could also be optimized.

Profit = total sales − total costs

Let $x$ = production quantity

Defects = $((x-10)/100)*x = (x^2 - 10x)/100$

-continued

Total sales = $.5x - .5((x^2 - 10x))/100$

" = $x - (x^2 - 10x)/100$

" = $x - x^2/100 - .1x$

To find the optimum revenue level, the first derivative is taken and set to zero.

$$.9x - 2x/100 = 0$$
$$2x/100 = .9$$
$$2x = 90$$
$$x = 45$$

Therefore by running this process where the production level is at 45 units, profits are maximized, even with accepting the cost of making 35% defects.

An important concept is utilizing variation about the mean. A manufacturing process is a series of steps or operations performed on materials to produce a product. A product, as produced by a process, is parameterized by a set of measurable physical and chemical specifications. All operations and materials used in a process have a degree of variation, as does the final product. The quantity N represents the population of measured parameter values of the operations, processes, and materials, as well as the final product. The mean of the quantity of N measured values refers to a central value. The mean may be at, above, or below the desired target.

Figure 3:
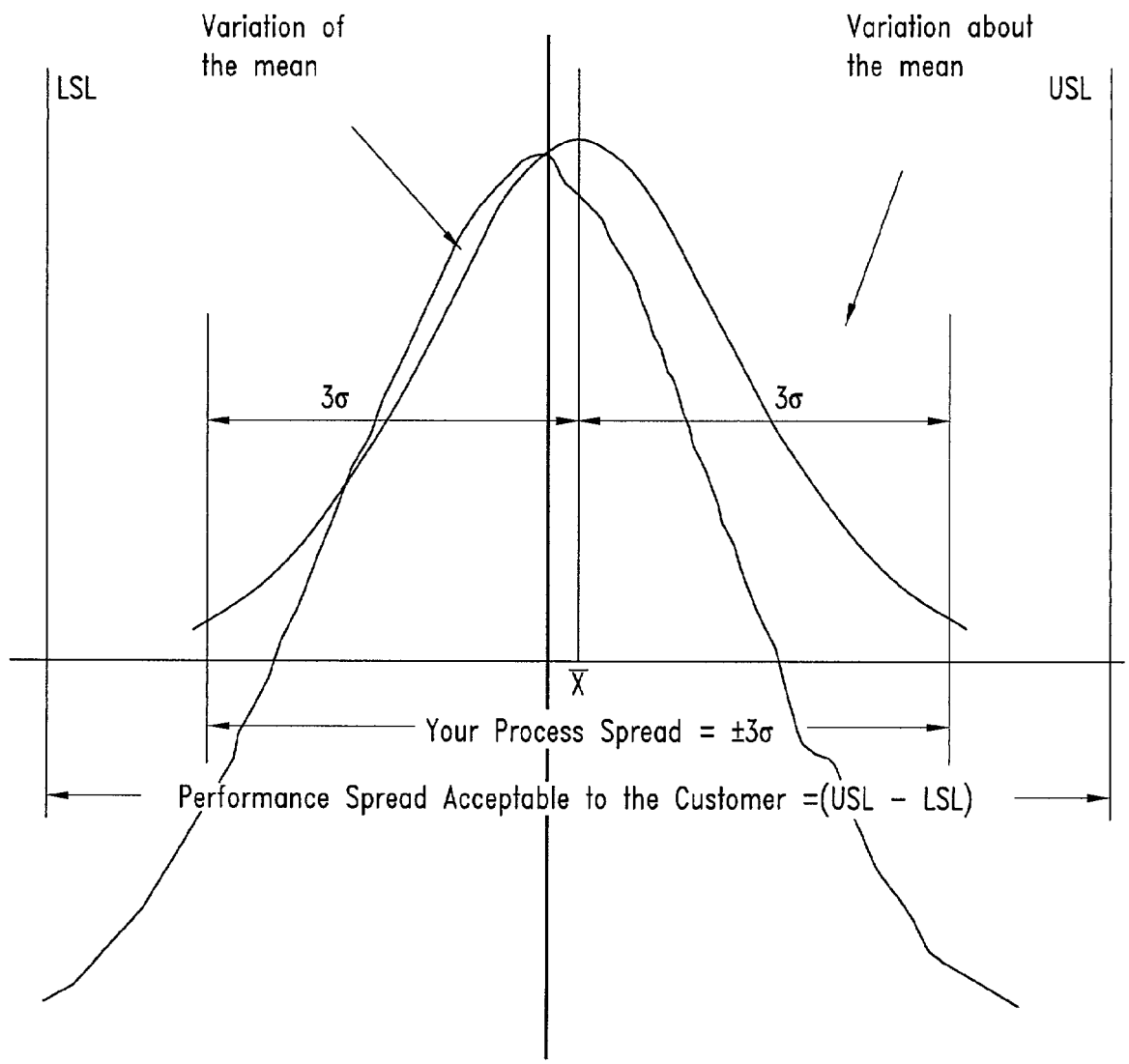
FIG. 3 is a graph illustrating variation about a mean and variation of a mean in a manufacturing process (process capability)

When the mean is not at the desired target, an adjustment can be made to change the mean to be at the target. This variation is described as "variation of the mean" $(Vo)(u_{of})$ and is illustrated in FIG. 3. Process control generally refers to an adjustment of the mean Vo $(u_{of})$ to bring it to target. This method is well known. A second and distinctly different type of variation is described as "variation about the mean" $(Va)(u_{abt})$. $Va(u_{abt})$ is a random variation of measured values that when combined in a large population N will cancel out. $Va(u_{abt})$ values above the mean will equal those below the mean. If a process is adjusted, based on a measured value (where the intent is to have the measured mean value equal to the target), that is actually $Va(u_{abt})$, it will move the process mean away from the desired target, i.e., it will make the process worse.

With respect to manufacturing processes where inputs have an effect on outputs, variation in one or more of the inputs will cause variation in one or more of the outputs. Variation of the mean from the target setpoint, such as tool wear, can be determined by measurement and corrected by a process change. The remaining variation, variation about the central mean, cannot be easily corrected.

An example is the roundness of a roll or natural vibration of a tool. If insufficient input is used, the output could have one or more variables below a minimum specification, such as thickness or strength. These defects result in scrap or downgraded output. If too much of an input is used, the output could have one or more variables above a maximum specification, such as thickness or strength. Subsequent operations could be used to reduce thickness to specifications, but this will add to the cost. Strength does not usually have an upper specification, but excess strength does not usually add benefit to the output, and it increases cost due to unneeded input expense.

Variations of inputs usually exhibit a range of measurement values approximating a normal distribution. If the target (mean) of the input is set to be at the specification limit, approximately 50% of the values will be below the limit and 50% will be above the limit. Accepted practice is to set the target of the input so that almost all of the input values fall within specification. This practice does not recognize that an input can be set at a point outside or below a specification in a manner that results in a greater economic benefit and results in more reliable and better output quality. This greater economic benefit is achieved by including the effect of the relationship of the input-output process and it's variations, with the cost, defect rate and price of the input-output function.

When a process has an output with a high price-to-cost ratio, a high level of defective outputs can be produced with a higher economic benefit than trying to make all good output. Conversely, if the output has a low price to cost ratio, a lower level of defective outputs can be produced to achieve a maximum process economic benefit. This optimum target setpoint is a function of the output cost and selling price, output specification, and the variation of the process inputs and outputs. The mean and standard deviation of the process describe the variation of the process.

With the method of the present invention, and based on the cost and selling price of the unit of output, it is possible to determine the percentage of defective units of output that can be produced for a breakeven profit. More particularly, to determine the point where total cost of the output is equal to the total revenue from the output. Let X equal the total number of units produced, D be the total number of defective units produced, C the unit cost of one unit of output, and P the unit price of one unit of output. The break-even profit occurs where Total Cost (TC) is equal to the Total Revenue (TR).

$$TC = TR$$
$$XC = P(X - D)$$
$$XC = PX - PD$$
$$-PD = XC - PX$$
$$PD = PX - XC$$
$$D = (PX - XC)/P$$
$$D = X(P - C)/P$$
$$D = X(1 - C/P)$$

For example, if cost is $0.01 and price is $1.00, a 99% level of rejects would result in breakeven. We also know that a profit level will occur at a reject rate of 0%, so the optimum operating point for inputs and outputs is somewhere between these values. This optimization point is where the marginal cost increase of varying an input is just equal to the marginal revenue of producing one more unit of good output. This method applies to the case where the manufacturing plant process can ship all outputs produced. Conversely this same method can be used when an output is fixed (limited demand for the output) with outputs and inputs reduced accordingly, which will lower all variable expenses. Determining this optimization point and defect rate will in turn permit the calculation of how many standard deviations should be used to set the mean target of this input. This can be calculated from the tables of normal distribution functions, which are readily available and will not be described herein.

The target means can be solved for a limited number of variables using algebraic or differential equations describing the input or the output variable or variables. Alternatively each input and output variable can be solved iteratively, holding all other variables constant. Commercially available software running on a personal computer can be configured to perform these calculations, which are within the abilities of one of ordinary skill and will not be described in further detail.

The following aspect of the present invention can be used alone or in connection with the foregoing embodiment to realize further savings in material and optimize output and, hence, profitability. This aspect of the invention uses variation about the mean of various inputs, such as thickness, weight, or other measured parameters to optimize one or more outputs. Inputs, such as a physical component, below the LSL are combined with inputs, such as a mating physical component, that are above the USL, resulting in a combination that is at the target point or within the specification range that is acceptable to the customer.

For example, wood logs can be peeled on a lathe to form sheets of veneer that when combined with resin, and pressed together will form plywood. Due to natural variation in the wood and in the process itself, peeled veneer typically has a tolerance (specification limit) of plus or minus 0.005 inches based on peeling a nominal 0.1-inch thick veneer. About one half of the veneer will be on the minus side. In the past, to ensure that there is enough veneer material to comply with finished product specifications, the veneer is peeled thicker than it would have to be had there been no variation. Some of the finished product can then sanded to finished size. This results in waste of resources, labor, and energy. An optimization alternative in accordance with the present invention is to measure the thickness of the veneer and sort it according to thickness. If the veneer is laid up randomly there will be approximately a normal distribution of pressed panel thicknesses based on the degree of variation of each of the veneer plies. Some of the pressed panels will be too thick because some or all thick veneer is used in the panel. Some panels will be too thin because some or all thin veneer is used in the panel. Sorting the veneer by thickness into thick and thin bins or into multiple bins based on veneer thickness can be used to lay up panels that are at specification or very close to specification, depending upon the sorting process used. Veneer of varying thickness can be combined to form finished plywood closer to finished specification. As a result, excess, additional veneer does not need to be sanded off to get to the final size. Measuring and matching the veneer makes variation about the mean work to the advantage of the processor so that the veneer can be peeled thinner than if it would be if were randomly assembled.

Because accurate measuring and tracking of components and operations is important to the successful implementation of the various embodiments of the invention, described below are further aspects of the invention in this regard.

Figure 4:
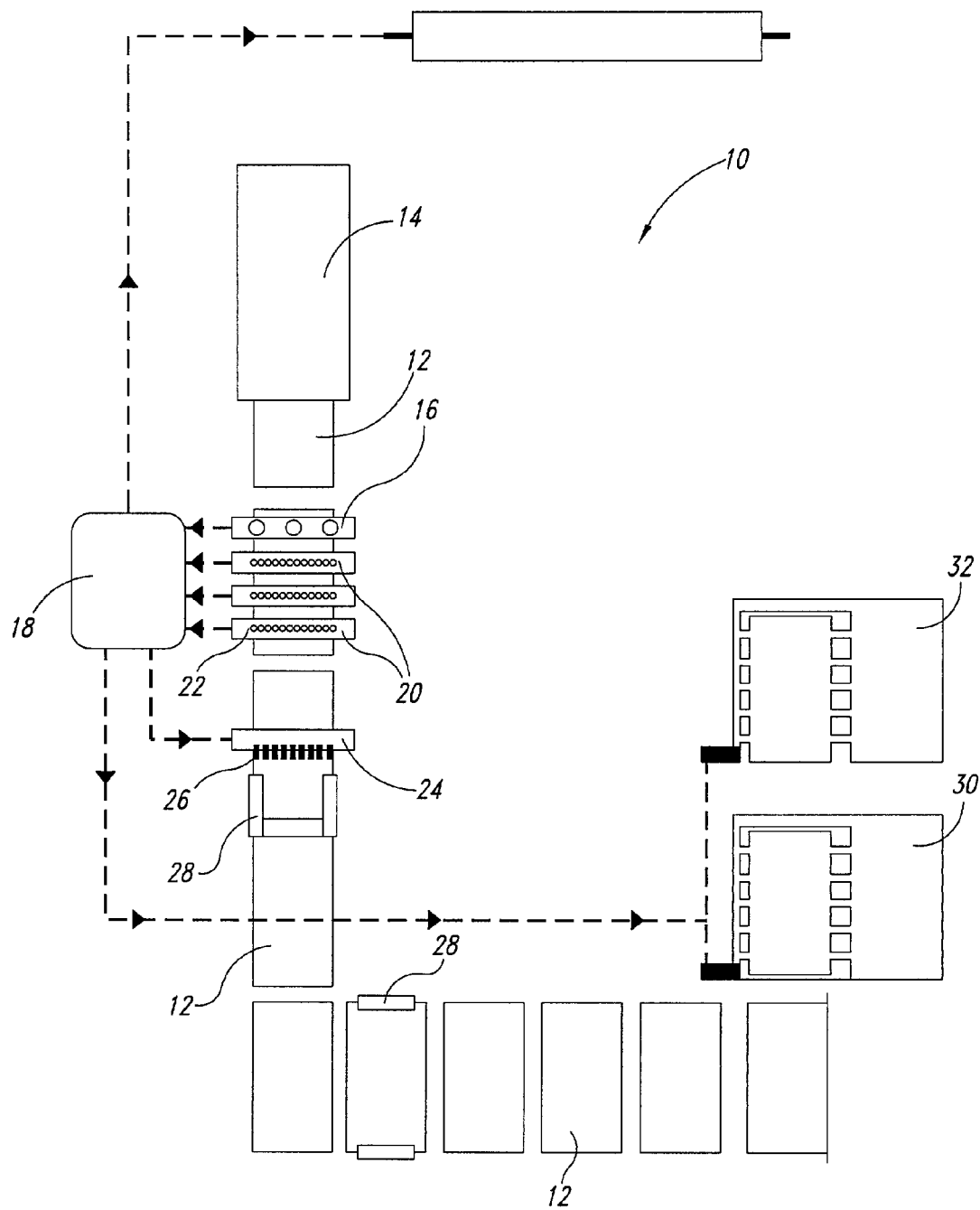
FIG. 4 is diagram representing a manufacturing control system formed in accordance with another embodiment of the present invention.

Referring next to FIG. 4, illustrated therein is one embodiment of a manufacturing process control system 10 formed in accordance with the present invention. It is to be understood that while the following embodiments of the invention will be described in the context of the manufacture of engineered wood, such as plywood, particle board, OSB, and the like, the system may be adapted for other goods, such as plastic sheets, ceiling tile, ceramic, Gypsum, glass, and similar products.

Freshly assembled engineered wood or plywood panels, (hereinafter referred to as "the product") 12 are inserted into the multiple or single opening press 14 (labeled as "1"). The press 14 is configured to provide applied pressure and heat that compresses the layers and resin of the product 12 into close contact, while the heat cures the resin. After the product leaves the press 14, it is conveyed through thickness measuring equipment 16 (labeled "2"). The technology used in the thickness measuring equipment 16 is preferably that provided by applicant, although other commercially available units can be used or adapted for use with the method of the present invention. The thickness measuring equipment 16 will not be described in detail herein. Briefly, the number of sensors used in the thickness measuring equipment 16 can vary and must be accurate and have a high sampling rate. The thickness measuring equipment 16 generates a thickness signal that is received by a process controller 18 (labeled "3") in order to validate the operator's defined product parameters that have been previously determined and stored in the process controller 18. The thickness measurement can also be used to automatically change the grading parameters within the process controller 18.

The product 12 then enters a series of bond measurement systems 20. The number of systems 20 may vary from application to application, but some degree of redundancy is recommended to achieve the reliability and accuracy to ensure that the purposeful production of a controlled quantity of defects, are identified and not shipped. In a preferred embodiment, each system 20 comprises a plurality of sensors, such as acoustic transducers 22 (not shown in detail), that are configured to transmit and receive acoustic signals in a known manner. Such systems 20 are commercially available from applicants' assignee and will not be described in detail herein. Each system generates a bond measurement signal that is received by the process controller 18 where it is processed and used to grade the product. In another embodiment the measurement data is used to control the press and/or earlier operations and materials. In one embodiment, the data is visually displayed on a display device for an operator to further inspect and adjust or control the process. In another embodiment, a heat sensor system, preferably an infrared thermometer is used to measure the temperature of the product 12, which is fed back to the controller 18. The controller 18 is configured to compensate for temperature changes by modifying the grading parameters based on temperature.

The process controller 18 measures panel bond strength and inspects for internal defects including but not limited to, delaminations, blows, blisters, weak bonds and dry-outs. Based on programmed SPC rules, the process controller can either increase or decrease the cycle time, pressure or temperature (CPT) at the multiple, continuous or single opening press 14. If too many defects are produced under the programmed SPC rules, the process controller 18 or operator will vary CPT to optimize the press. Conversely, if too many good panels are produced under the programmed SPC rules, the process controller 18 or operator will vary CPT in order to optimize the process.

The process controller 18 is also used to determine whether or not a marking system 22 marks the product with a unique identifier. The decision is based upon the results of the bond inspection. If none of the measurement systems identify a defect in the product, a unique identifier is placed on the product to identify it as "good product" ("good product marking"). The precise method of marking and the content of the mark are determined by either the equipment supplier or the user of the equipment. In one embodiment, ink jets 26 are used to mark the product 12 visually, although other methods may be used, including invisible ink, notching of the product 12, Universal Product Code, attaching a sensor or transceiver, and other methods known in the art. It is important that every non-defective product is marked. The mark signifies that that particular product 12 met all the quality requirements and is shippable to a customer. This marking method can be used for any measured variable.

The product 12 is then prepared for the finishing process. At some point in the process, the product will pass through trim saws 28 (labeled as 6). The location of the trim saws 28 has little bearing on the process. One or two may be placed after the marking system 24, or they may be positioned before or around the series of bond measurement equipment 20. The shorter the distance the bond measuring system 20 is from the press 14, the quicker the process 10 can be modified to maximize profit.

The process control computer 18 is, in one embodiment, capable of producing relay outputs that signal whether the product 12 is to be placed in a good panel bin 30 (labeled as 7) or in a reject panel bin(s) 32 (labeled as 8).

Figure 5:
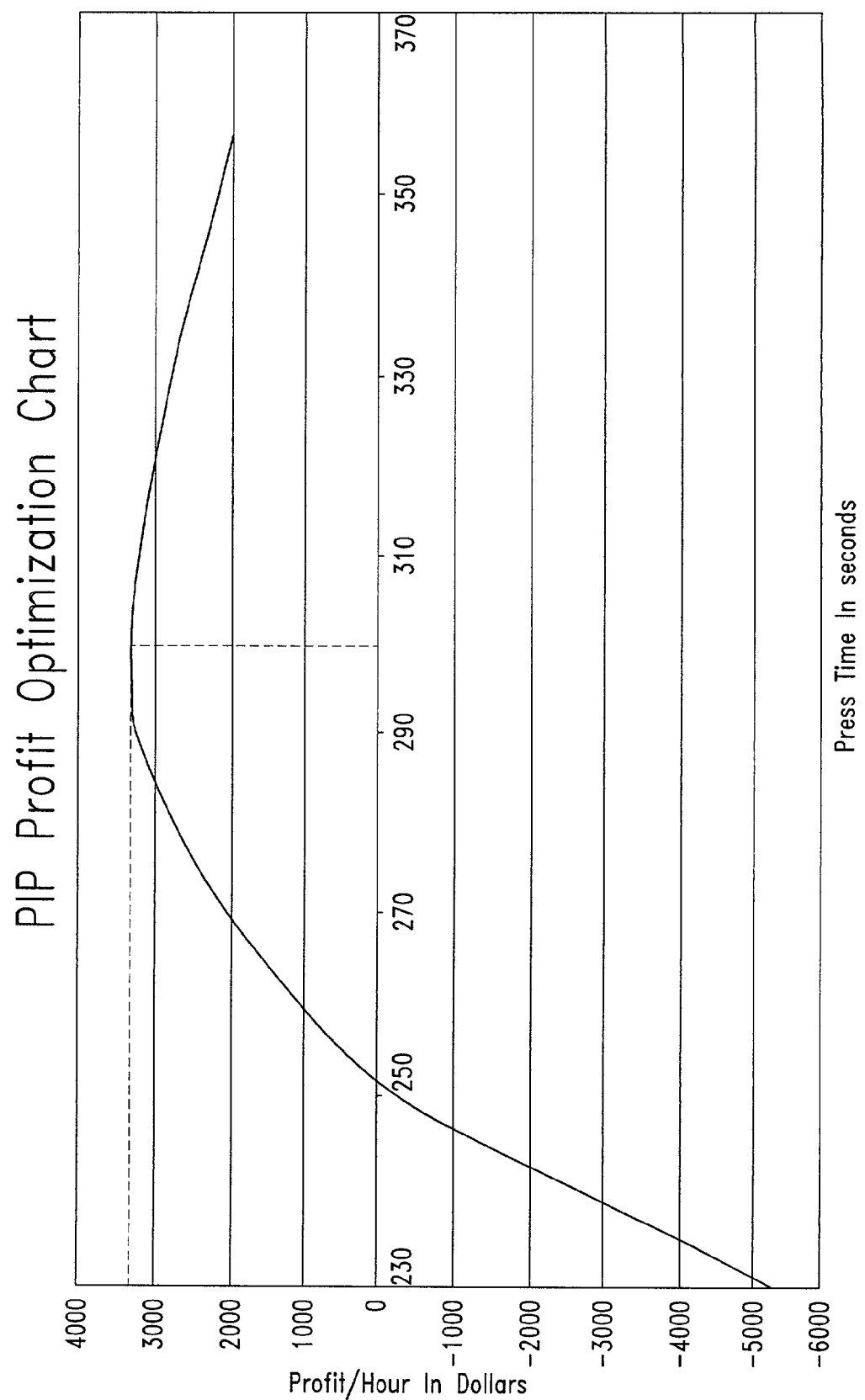
FIG. 5 is a profit optimization chart illustrating a profit curve as a function of press time.

Optimization will occur at the point where varying CPT will reduce profit. FIG. 5 depicts a Profit versus Press Cycle Time chart (similar charts could be generated for pressure and/or temperature) for a typical engineered wood or plywood manufacturer. The enclosed data is not modeled after any particular operation; it is merely presented as an example.

In simple terms, products with defects generate negative profit and products without defects generate positive profit. Negative profit will be generated at and below a given press time for a particular process and product. This can be seen in FIG. 5. Positive profit will be generated above the given press time of about 252 seconds. FIG. 5 also clearly illustrates that a maximum profit level can be achieved at a certain press time, here approximately 300 seconds.

It is important to note that obtaining this maximum profit level will involve manufacturing a certain percentage of bad product. The percentage of allowable bad product is dependent on the cost of the bad product and the value of a good product. The embodiments of the present invention are capable of both decreasing and increasing the press times in order to achieve the maximum profit level. The business model described herein enables the user to maximize production output and minimize production costs, including energy utilization, or some combination of the two.

As will be readily appreciated from the foregoing, in the case of engineered wood or plywood, a reduction in press cycle time or pressure reduces the compression of the panel resulting in less dense, lighter and more nailable panels. The reduced compression results in lower raw material utilization. In plywood, less raw materials result in thinner green veneer that needs to be dried. This results in additional energy savings.

Figure 6:
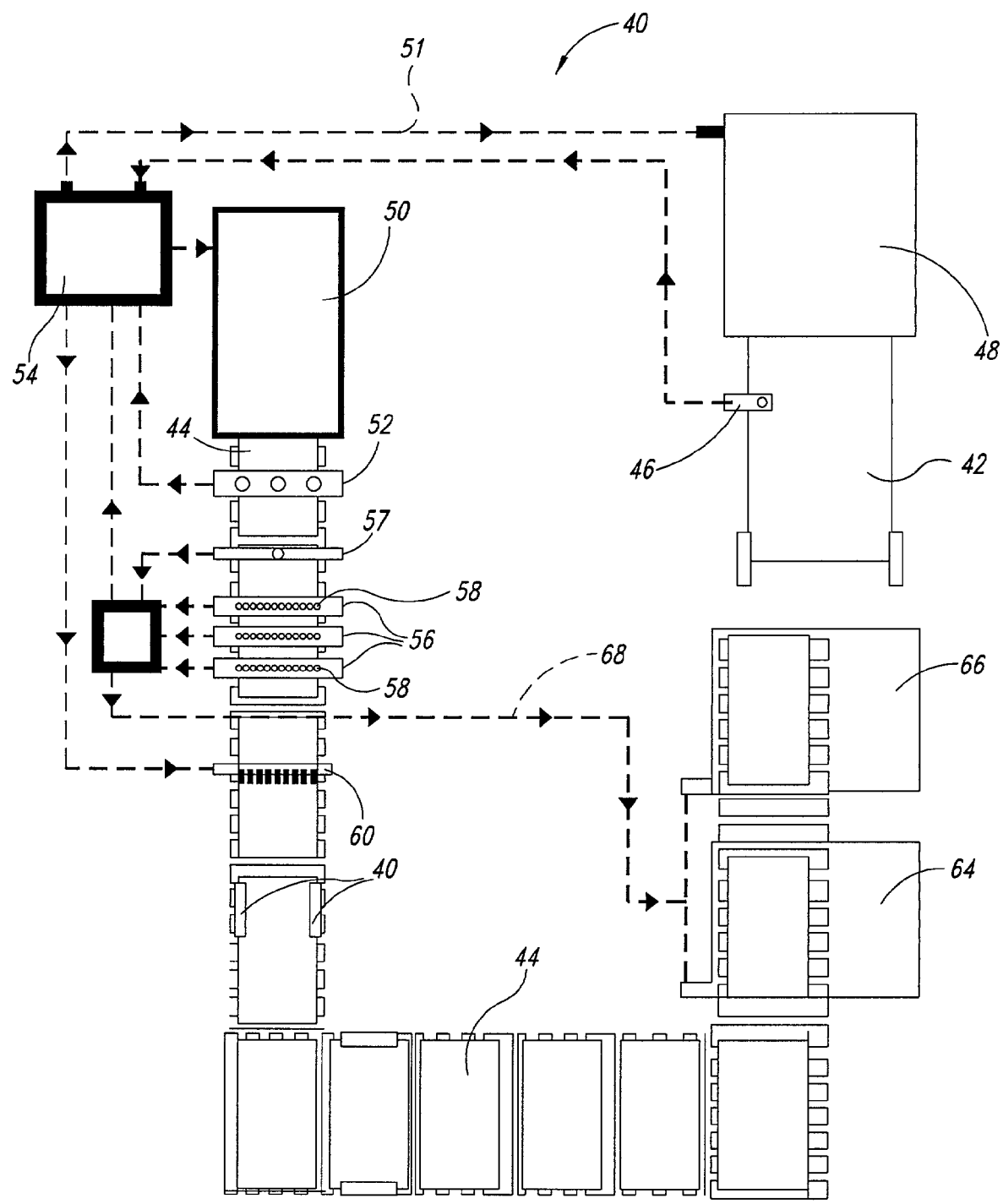
FIG. 6 a is diagram representing a manufacturing control system formed in accordance with one embodiment of the present invention.

Set forth below is a description of another embodiment of the invention as applied to the production of veneer, which is illustrated in FIG. 6.

A veneer production stage 40 is shown, consisting of several process steps that include peeling, clipping, and green veneer stacking. Typically, trees are cut into blocks and conditioned for the peeling process. The method of conditioning is dependent on the type of tree species and environmental conditions. The conditioned blocks are turned and peeled on a lathe in order to produce the veneer ribbon. The veneer ribbon 42 is then conveyed to a clipper where defects are removed and sheets 44 of standard dimensions are produced. A thickness measurement system 46 is placed after the lathe or after the plywood press in order to provide manual or automatic control feedback, to the lathe. Thickness control will reduce raw material costs and energy costs for the veneer dyer 48. The green veneer is dried in the dryer 48 to moisture content suitable for proper bonding of the resin and veneer or other core. Thinner veneer will result in reduced dryer loads. Additional panel thickness measurements taken after the dryer and/or at the thickness measurement system 52 after the press 50 can also be used in the veneer control feedback loop 51.

The system also includes a process controller 54 configured to receive signals 53 from the thickness gauge 46, from the thickness measurement system 52, and a hot/cold panel sensor 57. The controller includes a microprocessor formed in accordance with known configurations and adapted to process the signals in accordance with the disclosed methods of the present invention.

A bond integrity inspection system 56 either manually or automatically controlling the press, by measuring bond strength, with DSP capability functions as described above with respect to FIG. 1 and includes transducers 58 arranged in a triple redundancy configuration. A panel marker 60 marks the location of defects in the panel as well as marking good panels. Following the trim saws 62, the panels 44 are sorted into a good panel bin 64 or into reject panel bins 66 by control signals 68 sent from the inspection system 56.

It is desirable to measure veneer thickness after the veneer is laid up and pressed into panel form as this is representative of true veneer thickness. If the veneer is only measured after the lathe and before the panel is pressed into final form, the drying of the green veneer causes dimensional shrinkage, the veneer could be crushed, by an amount due to veneer smoothness during pressing, resulting in incorrect panel thickness, and wasted raw material.

Figure 7:
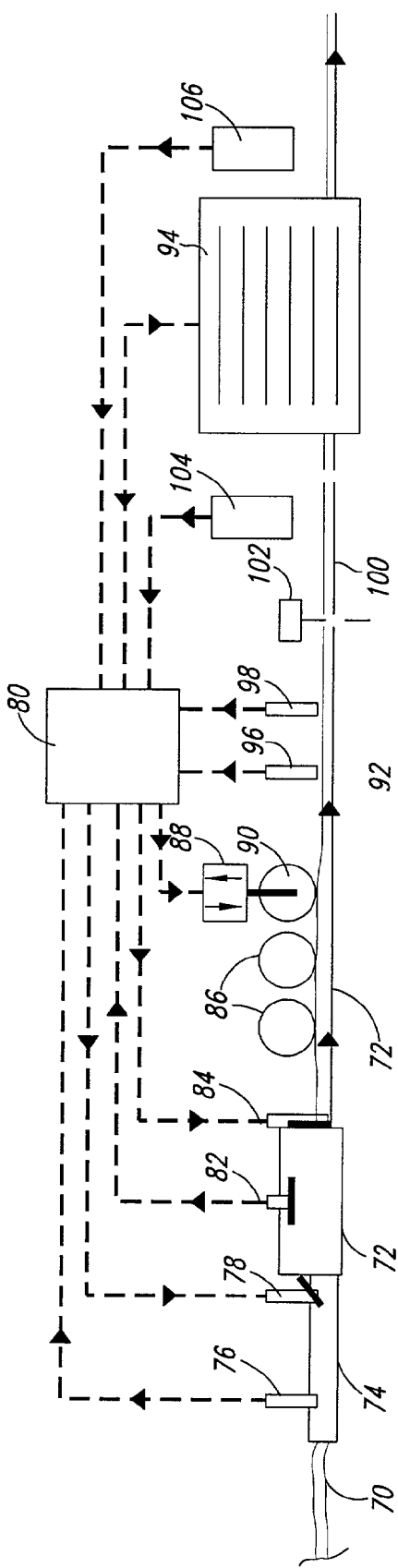
FIG. 7 is a diagram illustrating a manufacturing control system for ceiling tiles formed in accordance with another embodiment of the present invention.

In accordance with another embodiment of the invention, a process for ceiling tile manufacture is described in conjunction with FIG. 7. As shown therein, pulp 70, usually consisting of, but not limited to, water, paper, perlite and mineral wool, is transferred to the stock box 72, or a similar material storage vessel by piping 74. A consistency meter 76, or similar instrument known in the art, monitors the inflow density of the pulp 70. The amount of flow allowed into the stock box 72 is adjusted by the stock valve 78 and controlled by the electronic process controller 80, where all process variables can be monitored and controlled. The number of stock valves 78 is dependent on the individual process line and may include more than one valve. Level indicators 82 monitor the level of pulp 70 in the stock box 72. The number of level indicators is dependent on the individual process line. The amount of pulp 70 that exits the stock box 72 is controlled by a gate valve 84 or similar device.

The pulp 70 is then conveyed to a series of forming rollers 86. The method of conveyance and the number of forming rollers 86 will depend on the application. The height of the forming rollers 86 is controlled either manually or automatically from the process controller 80, and the positioning of the forming rollers 86 is performed by actuators 88 or manual control. The user of this embodiment of the invention can choose to control the position of any of the forming rollers 86, but at a minimum it must control the last roller 90. The pulp 70 is then conveyed through measurement devices 92 that will provide feedback to the process controller 80 in order to adjust the temperature and/or time of the kiln 94. These measurement devices 92 can consist of density analyzers 96 or moisture analyzers 98 or both. The selected technology of these devices is variable; however, it is important that they provide accurate, real-time measurements to the process controller 80.

The pulp 70 is cut into dimensional panels 100 by a knife 102. This provides a panel gap that enables self-calibration by thickness gauges 104. The thickness gauges 104 may be obtained commercially from Ultrasonic Arrays in Woodinville, Wash. They are non-contact, self-calibrating ultrasonic gauges designed for such on-line applications. Other technology can be substituted; however, it is important that an accurate measurement is transmitted to the process controller 80. A certain degree of thickness measurement redundancy is suggested, as well as DSP. The pulp or board 70 is then conveyed into the kiln 94 for a set amount of time and at a set temperature program, dependent upon time and/or moisture measurement. These variables are dependent on the product composition and thickness. The variables can be automatically or manually adjusted based on the feedback of the thickness gauges 104, density or basis weight analyzer 96, and/or the moisture analyzer 98.

All of the previously mentioned items are forward feeding multi-variable control devices for the kiln 94. The objective is to optimize the process. Additional thickness gauges 106 are located after the kiln 94 in order to provide process feedback to the process controller 80. A certain degree of thickness measurement redundancy is recommended.

The described process in FIG. 7 is also applicable to the manufacturing of gypsum wallboard. Instead of a pulp mixture, a slurry mixture is used which may include, but is not limited to, stucco, water, soap foam, perlite, starch, fiberglass, and vermiculite. The slurry is also conveyed through a formation process, where paper facings are applied and later cut into panels prior to a drying oven. The same objective and controls are applicable to this process.

The described process FIG. 7 is also applicable to the manufacturing of float glass. Instead of a pulp mixture, frit is mixed with cullet (refuse glass) in a feed hopper and is melted in a continuous tank furnace. The molten glass is poured onto a shallow bed of molten metal, usually tin or zinc. The molten glass spreads out on the bed of molten metal to form a level surface. Traditionally, thickness is manually controlled by the speed at which the molten glass ribbon is drawn off the molten metal bath.

These embodiments of the invention will allow the manufacturer to use on-line thickness measurements as feedback control to automatically control the speed at which the ribbon is drawn and at which the glass is formed. The ribbon is then conveyed to the annealing station, where it is heated and cooled in order to create a finished polish. This drawing process makes the edges of the ribbon unusable due to the impressions caused by the tractor wheels. The edges are trimmed to produce the finished product. This invention will allow the manufacturers to reduce the amount of material that is trimmed. A distance or thickness gauge can be used to determine the transitional point where the bulbous to flat surface occurs. Additionally, the finished goods thickness measurement can also be manually or automatically fed back to the ribbon draw control scheme.

The described processes in FIGS. 6 and 7 are also applicable to the manufacturing of rubber. Instead of a pulp mixture, the rubber compound may include, but is not limited to, raw rubber, curatives, accelerants, reinforcing fillers, pigments, plasticisers, anti-oxidants/anti-ozonants and process aids. The constituents are combined in a mixing process in order to create the uncured rubber compound. The uncured rubber can be produced into sheeting or extruded through a sharp die. The rubber components can be produced by a number of processes, including extrusion, calendaring, coating onto fabric, and molding. The ability to provide accurate, on-line thickness measurement for any one of these processes will allow the manufacturer to reduce energy costs and raw materials from thickness control and/or other measured variables. Cross-axis control may be used to create a more uniform sheet or web profile. Bond measurements, similar to the one performed in FIG. 4, will not only be used for quality control purposes, but it will also allow the manufacturers to increase output and decrease production and/or transportation costs by reducing the vulcanizing time.

The process control schemes described herein are also applicable to the manufacturing of paper. The pulp used in paper manufacturing is created by either cooking wood chips in a digester with heat and chemicals or the wood chips are ground in a refiner where heat is applied to break the chips down into fiber. The wet paper/pulp is conveyed on a "wire" conveyor in a similar method as shown in FIG. 7. The wet paper sheet is transferred to a felt belt where it is run though a series of press rollers to remove the water. It is also transferred over a series of steam-heated cylinders in the dryer section. Significant energy and raw material savings can be realized with the described process control scheme.

The process control schemes are also be applicable to the manufacturing of tile and bricks, including refractory bricks. The material is cast or molded into a "green" stage while is placed in a furnace or kiln. Accurate, real-time thickness/weight measurements allow the manufacturer to reduce product thickness and weight, thus realizing energy savings from reduced furnace loads and transportation costs. The manufacturer can also realize savings from reduced raw material utilization.

The process control schemes are further applicable to the manufacturing of printed circuit boards. The board lay-up process can consist of impregnating fiberglass sheets, which are bonded to copper sheets with epoxy resin. The boards are then conveyed into a hot press. Accurate, real-time thickness/other measurements allow the manufacturer to reduce product thickness/weight, thus realizing energy savings from reduced press loads as well as cost savings. On-line bond measurement systems allow the manufacturer to reduce the press times while insuring that only good product is shipped. Reduced press times result in lower costs of natural resources and productivity increases.

Lumber manufacturing is another application that can use thickness measurement based process control to reap large benefits. The manufacturer can realize savings in natural resources from reducing the dimensional variances of the lumber due to a more efficient and/or reduced dryer load. Additional savings in the form of reduced raw material utilization and transport costs will also be realized.

Foam manufacturing is another application that can use thickness and/or other measurement sensor-based process control to reap large benefits. The manufacturer can realize energy savings from reducing the dimensional variances of the foam due to reduced raw material utilization, energy requirements, and transportation Optimum Set Point Determination The reduction of production costs and/or increased profits includes but is not limited to raw materials and energy, and the increase of output is as a result of the reduction of process times. The point of maximum process optimization generally occurs where maximum profit is realized from the process. At this point, adjusting the process variable(s) in any direction will decrease realized profits.

This system of the present invention is capable of determining and controlling the process to the point of maximum process optimization. The required inputs include but are not limited to the identification of key process input and output variables, the determination of the output defect rate based on changing one or more key input variables, sales price of the product, the utility of producing one unit of good product and the cost of producing one unit of bad product. These inputs, along with process control variables such as mean, standard deviation, sample variation, sampled values, upper and lower control limits, nominal product target specifications, minimum, and maximum of measured key variables, are used to calculate the process set points that will lead to the described process optimization.

Figure 8:
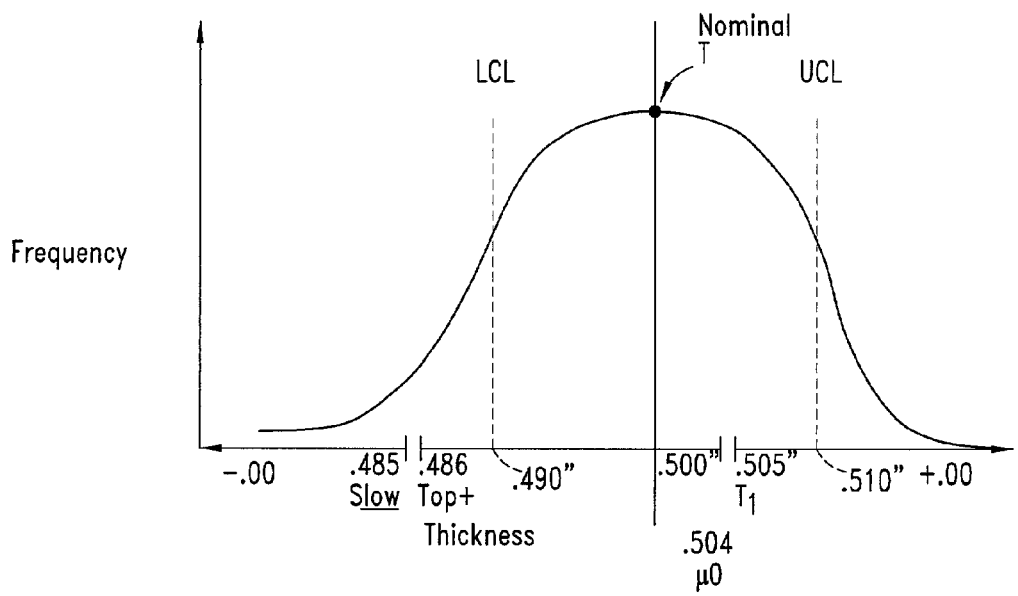
FIG. 8 is a graph illustrating the optimum set point as a function of thickness and time in the manufacture of a panel.

FIG. 8 illustrates a generalized curve in the manufacture of wood product where thickness is the controlled variable for determining the optimum set point. The frequency of occurrence of the thickness measurements is shown on the vertical scale or y-axis. The thickness in inches of the measured product is shown along the horizontal scale or the x-axis. The Lower Control Limit (LCL) is shown at 0.490 inches and the Upper Control limit (UCL) is shown at 0.510 inches. Unacceptable or bad product would be below the LCL and above the UCL. The optimum set point (Topt) is shown at the apex of the curve midway between the LCL and UCL, although it does not necessarily have to be at the apex of the curve. In one embodiment, the optimum set point will be where the integral of the curve from negative infinity to Topt is equal to the integral of the curve from Topt to positive infinity.

Where the UCL and LCL are not set at equal points from the Topt, the Topt point is determined by one-half the difference between the integral from negative infinity to LCL and the integral from UCL to positive infinity.

Figure 9:
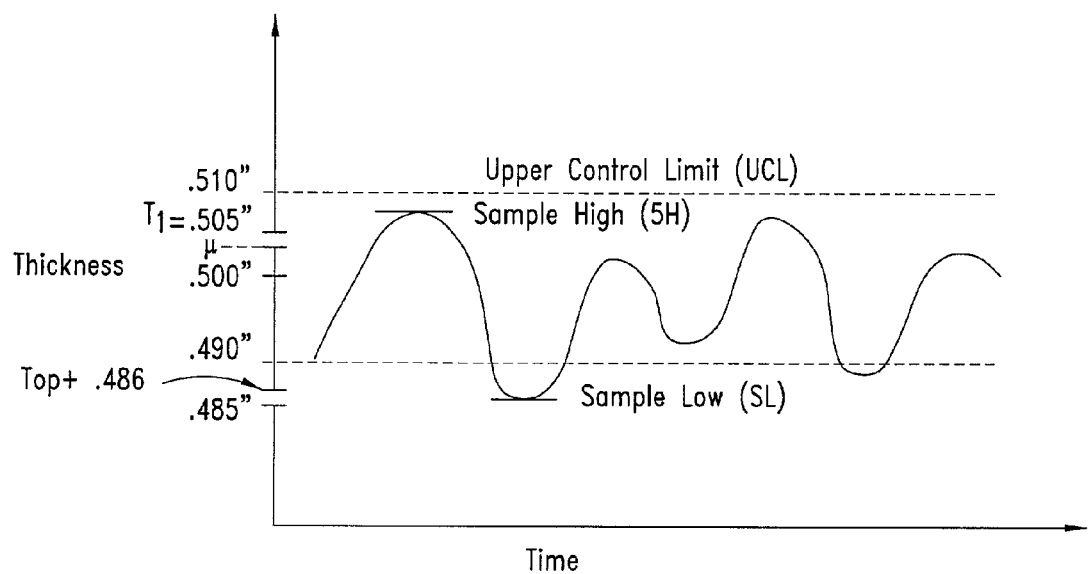
FIG. 9 is a graph illustrating the measured panel thickness over time.

However, in certain processes the optimum set point may need to be adjusted to accommodate for other variables. For example, shown in FIG. 9 is a graph of measured panel thickness over time. The UCL and LCL are now shown horizontally. A mean of the curve $\mu$ is shown at 0.504 inches. The Nominal of 0.500 inches is initially modified upward to T1 by 0.005 inches to give the customer a sanding tolerance. Shown on the graph are the actual Sampled High (SH) and Sampled Low (SL) points for the time period shown. In this case the SL is at 0.485 inches. The approximate value for the optimum set point is determined from the formula below:

$$\text{Topt} = T1 - (\mu - SL).$$

Using the values from above example, the final value of Topt is:

$$0.505 - (0.504 - 0.485) = 0.486 \text{ inches}.$$

In situations where fewer bad products can be tolerated, the optimum set point is further adjusted. While the theoretical profit maximization may not be realized, a maximum achievable profit can be attained at the desired level of fewer defective product using the process and methodology of the embodiments of the disclosed invention.

A process controller, such as that described in conjunction with FIGS. 4, 6 and 7, is configured to perform the calculations above and arrive at an optimum set point that meets a customer's needs. The set point is maintained for the selected variable, whether it is the thickness, temperature, moisture content, weight, or other quantifiable variable.

A further process optimization can be applied to a point or points that occur at an intersection of a supply/demand/shipment curve and a cost/volume curve. These curves assume there is some limiting factor in the production process. These variables include but are not limited to defect rate, volume, variable costs, production, price, sales, shipments, and fixed costs.

Figure 10:
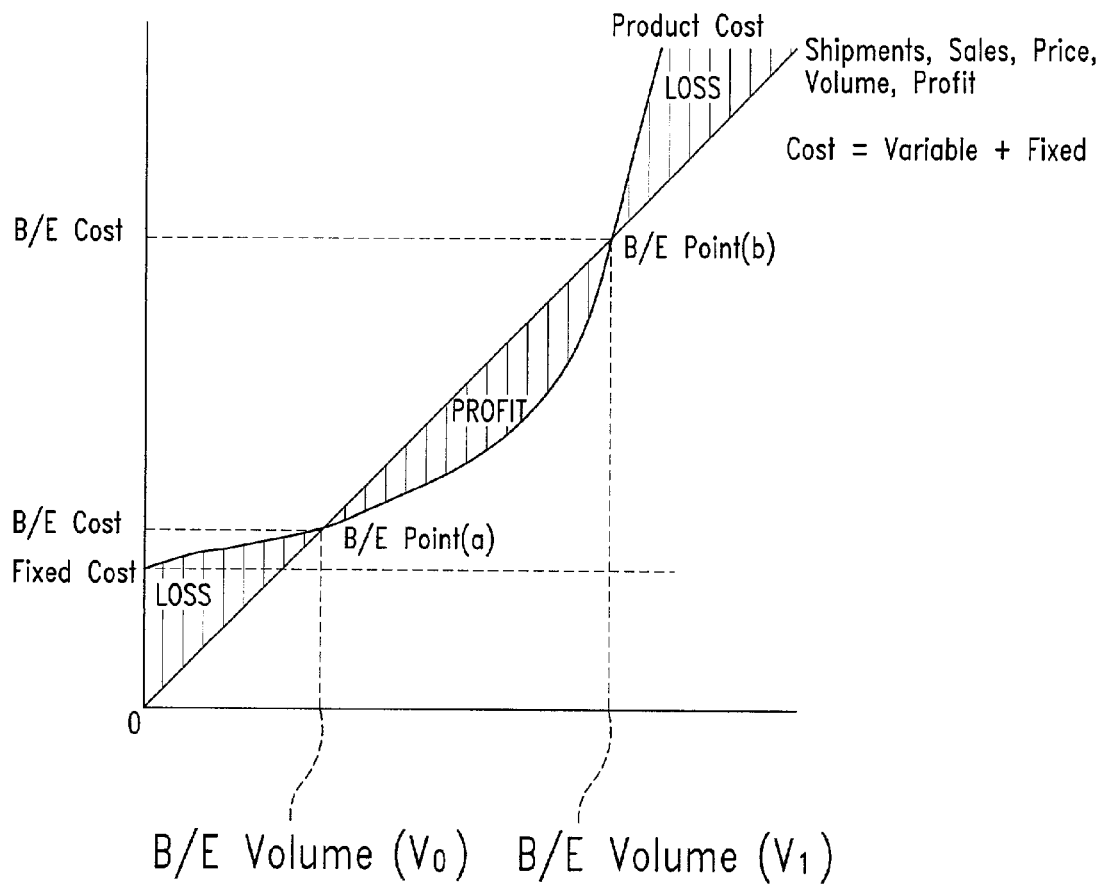
FIG. 10 is a graph of product price and costs with respect to volume.

The number of intersecting optimization points and breakeven points is dependent upon the order of the differential equations describing these relationships, as in differential equations. A graph of a typical second order equation is shown in FIG. 10 where Point$_{(A)}$ and Point$_{(B)}$ represent breakeven points, above and below which, respectively, a process will operate at a loss. Below the non-linear graph of the variable costs is an area representing the total costs at each volume level. For example, Volume (V$_0$) is the volume at Breakeven Point$_{(A)}$ and Volume (V$_1$) is the volume at Breakeven Point$_{(B)}$. The product cost curve represents total product cost of the sum of fixed and variable costs, and it intersects the linear graph at Breakeven Point$_{(A)}$ and Breakeven Point$_{(B)}$.

Within the area, between these curves from Breakeven Point(A) and Breakeven Point(B), is an area of maximum profit, labeled "PROFIT." Operating inside this area will result in profits, and operating outside this area will result in a loss. An approximation of maximum profit is to use one-half of the distance between the two volumes, which will occur at ½(V1+V0). Breakeven points A and B (V0 and V1) can be found by taking the derivatives of the cost and supply, sales, and shipment curves where dC/dV=dS/dV, where C=Cost, V=Volume, and S=Supply /Demand/Shipment. Calculation of the PROFIT area can be determined by one skilled in the art using known mathematical integration techniques and is not described in detail herein.

In accordance with yet another embodiment of the invention, a method of solving for changes in multiple input variables is provided so that the combination of input changes results in an optimization of output (maximum profit). This method requires solving for a combination of input changes that optimizes output based on defect rates, cost and selling price. The method utilizes a mathematical model, function or equation, which will be known to those skilled in the art, of the change in each individual input and the change in output based on defect rate, cost and selling price. These functions are then solved simultaneously to arrive at optimum input and output target set-points. This model of input changes and resulting output changes can be solved iteratively, such as on a computer.

It is to be understood that the disclosed embodiments of the invention will also find usefulness in the manufacture of plastic sheets, food, pharmaceuticals, non-woven and woven fabrics and textiles, films, laminates, corrugated paper, ceramics, and metals. The embodiments of the invention will be most useful and most easily implemented in processes that are more out of control than processes that have little variance in the controlled variable(s).

The invention claimed is:

1. A computer-implemented method of controlling a process for producing product within a range of at least one specification and product that are not within the range of at least one specification, the process having at least one input and at least one output that is affected by variation in at least one input, the method comprising:
   calculating the marginal revenue of producing one or more product within range of the at least one specification, one more product outside of the range of the at least one specification, and a variation about a mean of at least one measured variable of the at least one input and the at least one output; and
   varying the at least one input about the mean of at least one specification of the at least one measured variable so that the at least one output affected by the at least one input is optimized to where the marginal revenue of producing one more product within the at least one specification range is substantially equal to the marginal cost of producing one more product outside the at least one specification range.

2. The method of claim 1, further comprising determining the relationship of input variable change to rate of defects.

3. A method of optimizing a process having at least one output that varies in response to variation of at least one input, the method comprising:
   determining variables of at least one input and at least one output to measure;
   measuring the variables of the at least one input and the at least one output while the variables are adjusted in the course of performing the process;
   calculating variation of the mean and variation about the mean for each of the measured variables of the at least one input and the at least one output;
   determining an adjustment in the variables in the at least one input required to bring the mean of the variables in the at least one output within a target value range;
   calculating the marginal cost of making one more product outside a specification range that is equal to the marginal revenue from making one more product within a specification range; and
   adjusting the variables in the at least one input to achieve an optimum setpoint of at least one selected variable of the at least one input so that the marginal cost of the making one more product outside the specification range equals the marginal revenue of making one more product within the specification range.

4. A method of optimizing a manufacturing process, comprising:
   providing a plurality of components configured to be assembled together into a single unit;
   measuring the plurality of components to identify components that are under a specification range and over the specification range; and
   assembling components that are under the specification range to components that are over the specification range to achieve a single unit that is within the specification range.

5. A manufacturing process, comprising:
   providing first subcomponents that are under a mean tolerance and second components that are over a mean tolerance; and
   assembling the first subcomponent that is under the mean tolerance with the second subcomponent that is over the mean tolerance to achieve a component formed of the first and second subcomponents that is at the mean tolerance.

6. The process of claim 5, wherein the first subcomponent is under the mean tolerance to the same degree that the second subcomponent is over the mean tolerance.

7. A method for controlling a process having one or more inputs and one or more outputs where outputs represent characteristics and definition of the product, and inputs are materials and process operations that produce outputs, the method comprising:
   identifying at least one output and corresponding inputs that when varied affect the output;
   measuring the identified at least one output and corresponding inputs;
   determining a variation of a mean and a variation about the mean for each of the at least one output and inputs; and
   determining an optimum value of the corresponding inputs to control the at least one input to a target point that represents where the marginal cost of producing one more defective product equals the marginal profit of producing one more non-defective product.

8. A method for controlling a process to produce acceptable product, comprising:
adjusting a process input about a mean of measurements of the process input to the point where the marginal cost of producing one more unit of defective product is equal to the marginal revenue from producing one more unit of non-defective product.

9. A computer-implemented method of optimizing a process having inputs and producing outputs in accordance with specifications, comprising:
measuring the inputs and outputs and saving measurement data obtained therefrom;
determining $U_{of}$ and $U_{abt}$ from the measurement data;
determining causes of $U_{of}$; and
controlling the causes of $U_{of}$ to shift $U_{of}$ to match $U_{abt}$ data values whereby a total cost of producing one more output outside of specification equals the total revenue of producing one more output that is within specification;
where $U_{of}$ is variation of a mean and $U_{abt}$ is variation about a mean of the measurement date.

10. The method of claim 9, further comprising:
determining the relationship between output defect rate and selected variables of at least one input;
modeling the relationship; and
solving for optimum set point of the selected variables of the at least one input.

11. The method of claim 10, wherein solving for optimum set point comprises utilizing functions for input variation, output defect rate, revenue, and cost.

12. The method of claim 9, wherein controlling $U_{of}$ comprises adjusting inputs.

13. A method of solving for changes in multiple input variables so that the combination of input changes results in an optimization of output, comprising: solving for a combination of input changes that optimizes output based on defect rates, cost and selling price by first solving for changes in individual inputs and the resulting change in output based on defect rate, cost and selling price, and then solving the changes in the individual inputs simultaneously to arrive at a set of optimum input and output target set-points whereby a marginal cost of producing one more output outside of specification equals the marginal revenue of producing one more output that is within specification.

14. A computer-implemented method, comprising: reducing input variables to produce a process set point of a product such that the marginal revenue from producing one more product within specification is equal to the cost of producing one more product outside of specification.

15. A computer implemented method of determining total process variation for each input and output variable, comprising calculating total variation that is composed of variation of the mean and variation about the mean; adjusting at least one process input variable so that variation of the mean is equal to zero; and adjusting remaining variation that is made up entirely of variation about the mean, which is used as a component in the computer implementation of a process set point such that marginal revenue from producing one more product within a range of at least one specification is equal to a marginal cost of producing one more product outside of the range of at least one specification.

* * * * *